United States Patent
Hung et al.

(10) Patent No.: US 8,768,421 B2
(45) Date of Patent: Jul. 1, 2014

(54) ELECTRONIC DEVICE AND ANTENNA RECEPTION TUNING METHOD THEREOF

(71) Applicants: Kuo-Chiang Hung, Taipei (TW);
Cheng-Wen Wang, Taipei (TW);
Chieh-Tsao Hwang, Taipei (TW);
Chang-Chih Chen, Taipei (TW);
Shih-Chia Liu, Taipei (TW)

(72) Inventors: Kuo-Chiang Hung, Taipei (TW);
Cheng-Wen Wang, Taipei (TW);
Chieh-Tsao Hwang, Taipei (TW);
Chang-Chih Chen, Taipei (TW);
Shih-Chia Liu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 13/672,669

(22) Filed: Nov. 8, 2012

(65) Prior Publication Data

US 2014/0051375 A1 Feb. 20, 2014

(30) Foreign Application Priority Data

Aug. 15, 2012 (TW) .............................. 101129555 A

(51) Int. Cl.
*H04M 1/00* (2006.01)
*H01Q 1/50* (2006.01)
*H01Q 9/42* (2006.01)
*H01Q 1/22* (2006.01)
*H04B 1/16* (2006.01)

(52) U.S. Cl.
CPC .. *H04B 1/16* (2013.01); *H01Q 1/50* (2013.01);
*H01Q 9/42* (2013.01); *H01Q 1/2266* (2013.01)
USPC ................... 455/575.1; 455/575.3; 455/575.7

(58) Field of Classification Search
USPC ......... 455/78, 80, 550.1, 575.1, 575.3, 575.4,
455/575.5, 269, 575.6, 90.1
See application file for complete search history.

(56) References Cited

U.S. PATENT DOCUMENTS

| | | | |
|---|---|---|---|
| 8,145,258 B2 * | 3/2012 | Sato et al. ................... | 455/575.3 |
| 2005/0096081 A1* | 5/2005 | Black et al. ................. | 455/575.1 |
| 2005/0130699 A1* | 6/2005 | Kim ............................ | 455/550.1 |

* cited by examiner

*Primary Examiner* — Thanh Le
(74) *Attorney, Agent, or Firm* — Jianq Chyun IP Office

(57) ABSTRACT

An electronic device and an antenna reception tuning method thereof are provided. The electronic device includes a first main body, a second main body, a sensing unit, and a processing unit. The second main body, including an antenna and a matching unit, is disposed on the first main body through a hinge and adapted for being opened or closed relative to the first main body. The sensing unit is disposed on the electronic device, adapted for detecting a distance between the first main body and the second main body, and generates a control signal according to the distance, wherein the distance includes an angle and an open/close state between the first and the second main bodies. The processing unit is electrically connected to the sensing unit and the matching unit, and adjusts the matching unit according to the received control signal.

20 Claims, 3 Drawing Sheets

ELECTRONIC DEVICE AND ANTENNA RECEPTION TUNING METHOD THEREOF

CROSS-REFERENCE TO RELATED APPLICATION

This application claims the priority benefit of Taiwan application serial no. 101129555, filed on Aug. 15, 2012. The entirety of the above-mentioned patent application is hereby incorporated by reference herein and made a part of this specification.

BACKGROUND OF THE INVENTION

1. Field of the Invention

The invention relates to an electronic device, and more particularly relates to an antenna of the electronic device and an antenna reception tuning method thereof.

2. Description of Related Art

Generally speaking, the antenna of the traditional hand-held electronic device, e.g. a notebook computer, is disposed on the top of the screen. Thus, an angle between the screen and the base of the electronic device does not affect the reception of wireless signals in the antenna. However, as technology advances in recent years, products that put focus on design, such as ultra book computers, are increasing, and there are more and more hand-held electronic devices using metal housing. When metal housing is used on a notebook computer, the antenna of the notebook computer has to be moved to the base near the hinge between the keyboard and the screen. As the angle between the screen and the base varies, the transmission/reception characteristics of the antenna, such as center frequency, radiation frequency, or directivity of the antenna, are changed as well, which may degrade the signal transmission/reception of the antenna. In addition, Microsoft Win 8 system uses AOAC standard (Always on, Always connected) in 2012, and Intel also regulates that a difference between the antenna efficiencies when the notebook computer is closed and opened shall not be over 50%. Therefore, how to maintain high performance of the antenna in any state of the notebook computer has become an important issue.

SUMMARY OF THE INVENTION

The invention provides an electronic device and an antenna tuning reception method thereof, adapted for adjusting an impedance of an antenna according to a distance between main bodies of the electronic device.

The invention provides an electronic device that includes a first main body, a second main body, a sensing unit, and a processing unit. The second main body, including at least one antenna and a matching unit, is disposed on the first main body through a hinge and adapted for being opened or closed relative to the first main body. The sensing unit is disposed on the electronic device for detecting a distance between the first main body and the second main body, and generates a control signal according to the distance. The processing unit is electrically connected to the sensing unit and the matching unit, and adjusts the matching unit according to the received control signal.

In an embodiment of the invention, the distance includes an angle between the first main body and the second main body.

In an embodiment of the invention, the distance includes an open/close state of the first main body and the second main body.

In an embodiment of the invention, the processing unit determines whether a setting of the matching unit is a optimizing impedance matching circuit according to the angle. Herein, if the matching unit is not the optimizing impedance matching circuit, the processing unit retrieves the optimizing impedance matching circuit of the matching unit that corresponds to the angle, generates the control signal according to the angle, and transmits the control signal to the matching unit to adjust the setting of the matching unit, such that the antenna has the best performance.

In an embodiment of the invention, if the setting of the matching unit is the optimizing impedance matching circuit, the processing unit maintains the setting of the matching unit.

In an embodiment of the invention, the electronic device further includes a database coupled to the processing unit. The processing unit retrieves from the database at least one data corresponding to the angle and obtains the optimizing impedance matching circuit according to the angle and the at least one data.

In an embodiment of the invention, if data of the optimizing impedance matching circuit stored in the database corresponds to data of a predetermined sector, the optimizing impedance matching circuit of the current angle is calculated and obtained by interpolation or extrapolation, etc.

In an embodiment of the invention, if the matching unit is not the optimizing impedance matching circuit, the processing unit automatically performs scanning to slightly adjust the matching unit according to the impedance matching value corresponding to the angle, so as to obtain the optimizing impedance matching circuit that corresponds to the angle.

In an embodiment of the invention, the sensing unit periodically detects the angle between the first main body and the second main body at a predetermined time.

In an embodiment of the invention, the antenna includes a radiation part, a short-circuit end, and a first feed-in end. The matching unit includes a second feed-in end and a diode. Herein, the second feed-in end is located between the radiation part and the first feed-in end of the antenna, and the diode is coupled between the second feed-in end and a ground end of the antenna.

In an embodiment of the invention, the first feed-in end is connected to an AC bias and the second feed-in end is connected to a DC bias.

In an embodiment of the invention, the feed-in of the first feed-in end and the second feed-in end are done via the same coaxial cable.

In an embodiment of the invention, if the sensing unit detects that the first main body and the second main body are in a close state, the DC bias turns on the diode.

The invention further provides an antenna reception tuning method, adapted for an electronic device, which includes a first main body and a second main body, wherein the first main body is adapted for being opened or closed relative to the second main body. The antenna reception tuning method includes the following steps. First, a distance between the first main body and the second main body is detected. Then, a control signal is generated according to the distance. Thereafter, a matching unit is adjusted according to the control signal.

In an embodiment of the invention, detecting the distance includes detecting an angle between the first main body and the second main body.

In an embodiment of the invention, detecting the distance includes detecting an open/close state of the first main body and the second main body.

In an embodiment of the invention, the step of adjusting the matching unit according to the control signal further includes determining whether a setting of the matching unit is the optimizing impedance matching circuit according to the angle. If the setting of the matching unit is not the optimizing impedance matching circuit, the optimizing impedance matching circuit of the matching unit that corresponds to the angle is obtained according to the angle. Then, the matching unit is adjusted by the optimizing impedance matching circuit, such that the antenna has the optimizing signal reception effect.

In an embodiment of the invention, if the setting of the matching unit is the optimizing impedance matching circuit, the setting of the matching unit is maintained.

In an embodiment of the invention, the step of calculating the optimizing impedance matching circuit of the matching unit that corresponds to the angle according to the angle includes retrieving at least one corresponding data from a database and calculating the optimizing impedance matching circuit corresponding to the angle according to the at least one data.

In an embodiment of the invention, if data of the optimizing impedance matching circuit stored in the database corresponds to data of a predetermined sector, the optimizing impedance matching circuit of the current angle is calculated and obtained by interpolation or extrapolation, etc.

In an embodiment of the invention, if the matching unit is not the optimizing impedance matching circuit, the processing unit automatically performs scanning to slightly adjust the impedance matching unit according to the impedance matching value corresponding to the angle, so as to obtain the optimizing impedance matching circuit that corresponds to the angle.

In an embodiment of the invention, the step of detecting the distance between the first main body and the second main body includes periodically detecting the angle between the first main body and the second main body at a predetermined time.

In an embodiment of the invention, the electronic device includes at least one antenna. The antenna includes a radiation part, a short-circuit end, and a first feed-in end. The matching unit includes a second feed-in end and a diode, wherein the second feed-in end is located between the radiation part and the first feed-in end of the antenna, and the diode is coupled between the second feed-in end and a ground end of the antenna.

In an embodiment of the invention, the step of adjusting the matching unit according to the control signal includes connecting the second feed-in end by the DC bias to turn on the diode if the sensing unit detects that the first main body and the second main body are in the close state.

Based on the above, the invention provides an electronic device and an antenna reception tuning method thereof for adjusting the setting of the impedance matching of the antenna according to the distance, e.g. angle and open/close state, between two main bodies, so as to adjust the antenna of the electronic device to the best transmission/reception state according to the angle and open/close state of the main bodies.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
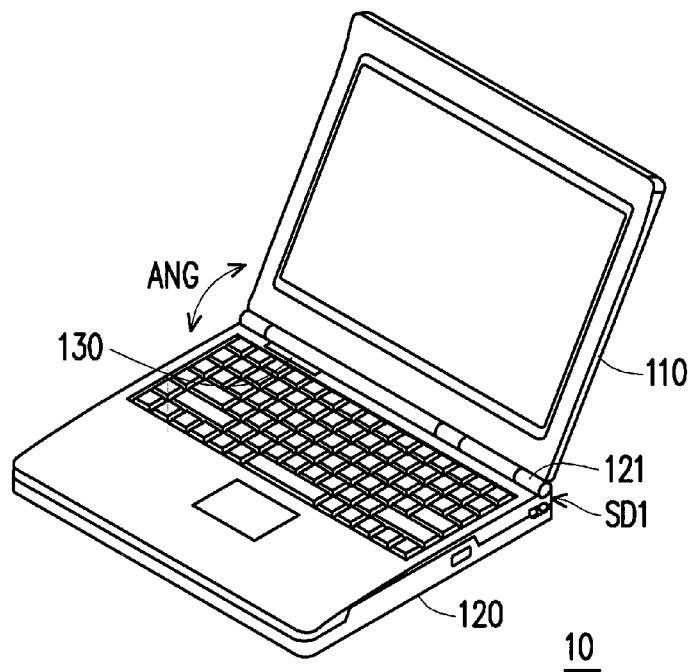
FIG. 1 is a schematic perspective view of an electronic device according to an embodiment of the invention.

FIG. 1 is a schematic perspective view of an electronic device according to an embodiment of the invention. Referring to FIG. 1, an electronic device 10 includes a first main body 110 and a second main body 120. The second main body 120, including an antenna 130 and a matching unit (not shown), is disposed on the first main body 110 through a hinge 121 and adapted for being opened or closed relative to the first main body 110. Herein, the hinge 121 is disposed at a side SD1 of the second main body 120. The antenna 130 is disposed on the second main body 120 and is near the side SD1 where the hinge 121 is disposed.

In this invention, the electronic device 10 may be a notebook computer, a tablet PC, etc. The antenna is for example used for receiving/transmitting wireless network signals, etc. that conforms to Wireless Fidelity (WiFi), but the invention is not limited thereto.

According to FIG. 1, a distance between the first main body 110 and the second main body 120, e.g. an angle ANG as shown in FIG. 1, may change a reception/transmission capacity of the antenna 130 and cause problems such as shift of center frequency, etc. For example, when the angle ANG is greater than 90 degrees, the center frequency of the antenna may shift to high frequency; and when the angle ANG is less than 90 degrees, the center frequency may shift to low frequency. Moreover, if the first main body 110 has a housing made of a metal material, the influence to the antenna 130 may be enhanced.

Figure 2:
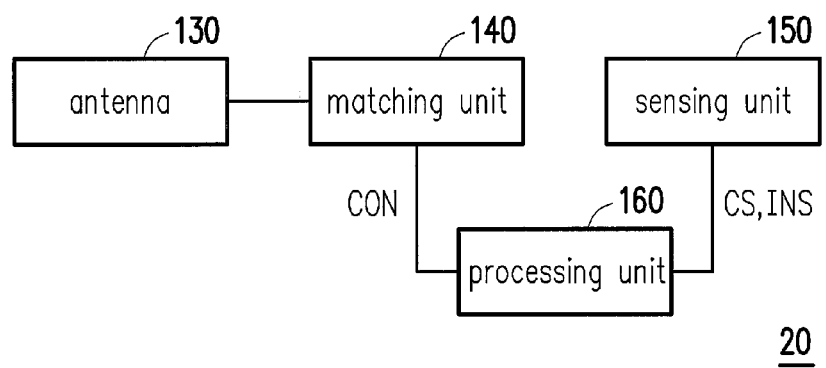
FIG. 2 is a block diagram of an electronic device according to an embodiment of the invention.

FIG. 2 is a block diagram of an electronic device according to an embodiment of the invention. Referring to FIG. 2, an electronic device 20 includes an antenna 130, a matching unit 140, a sensing unit 150, and a processing unit 160. This embodiment is the same as the embodiment of FIG. 1 that the antenna 130 is disposed on the second main body (the second main body 120 of FIG. 1) and is near the side (the side SD1 of the second main body 130 of FIG. 1) where the hinge (the hinge 121 of FIG. 1) is disposed. The matching unit 140 is connected to the antenna 130 for adjusting an impedance matching of the antenna 130 by a setting, such that the antenna 130 has the best radiation effect. The sensing unit 150 is disposed between the first main body 110 and the second main body 120 as shown in FIG. 1, and is adapted for detecting the distance between the first main body 110 and the second main body 120 as shown in FIG. 1, wherein the distance includes the angle ANG and the open/close state between the first main body 110 and the second main body 120. The sensing unit 150 generates a control signal CS according to the distance between the first main body 110 and the second main body 120.

The processing unit 160 is coupled to the matching unit 140 and the sensing unit 150. Herein, the processing unit 160 receives the control signal CS from the sensing unit 150 and adjusts the matching unit 140 according to the received control signal CS.

In an embodiment of the invention, the processing unit 160 determines whether a current setting of the matching unit 140 is a optimizing impedance matching circuit according to the angle ANG between the first main body 110 and the second main body 120, which is to determine a optimizing impedance matching value of the matching unit 140 that corresponds to the current angle ANG. If the current setting of the matching unit 140 is not the optimizing impedance matching circuit, the processing unit 160 calculates according to the angle ANG to obtain the optimizing impedance matching circuit CON of the matching unit 140 that corresponds to the current angle ANG The processing unit 160 then transmits the current optimizing impedance matching circuit CON to the matching unit 140 to adjust the setting of the matching unit 140, such that the antenna 130 has the best radiation efficiency. If the setting of the matching unit 140 is the optimizing impedance matching circuit CON, the processing unit 160 maintains the setting and does not make any change to the setting of the matching unit 140.

The matching unit 140 may include a plurality of transistors, a resistor set, a variable resistor, a variable capacitor, an inductor, or a feedback circuit, and adjust the equivalent resistance, capacitance, or inductance according to the optimizing impedance matching circuit CON transmitted by the processing unit 160. It is understood that persons skilled in the art may embody the matching unit by various ways, and thus detailed description is omitted hereinafter.

The processing unit 160 may calculate the optimizing impedance matching circuit CON by various methods. For instance, in an embodiment of the invention, the electronic device 20 further includes a database (not shown). The database is coupled to the processing unit 160, and the processing unit 160 retrieves at least one data corresponding to the angle ANG from the database and calculates the optimizing impedance matching circuit CON according to the angle ANG and the at least one data. For example, the database stores therein data of the optimizing impedance matching circuits respectively corresponding to angles ANG which differ by a predetermined unit. For instance, the database stores angles at every ten degrees between 30 to 150 degrees, each angle corresponding to one data of the optimizing impedance matching circuit. When the processing unit 160 receives the current angle ANG, the processing unit 160 retrieves from the database data of the optimizing impedance matching circuits that correspond to two angles which most approximate the current angle ANG, and calculates the optimizing impedance matching circuit CON of the current angle ANG by interpolation or extrapolation, etc.

In addition, in another embodiment of the invention, the processing unit 160 obtains the optimizing impedance matching circuit CON corresponding to the current angle ANG by a simpler method. In this embodiment, data of the optimizing impedance matching circuit CON stored in the database is corresponding to the data of a predetermined sector. For example, every ten degrees are set as one predetermined sector, and all angles ANG in one predetermined sector correspond to the same optimizing impedance matching circuit data CON. When the processing unit 160 receives the current angle ANG, the processing unit 160 directly retrieves from the database data of the optimizing impedance matching circuit CON that corresponds to the current angle ANG as the optimizing impedance matching circuit CON. Nonetheless, the invention is not limited to the aforementioned calculation methods, and persons skilled in the art may make adjustment based on actual demands.

In an embodiment of the invention, the electronic device has an operation mode of AOAC (Always on, Always connected). Even when the electronic device is not being used (e.g. the first main body and the second main body are in closed state, that is, the angle is 0), the antenna remains connected. Generally, the angle is about 90 degrees when the electronic device is in use. Considering the above, the distance between the first main body and the second main body is divided into two states, that is a close state (the angle is 0) and an open state (the angle is greater than 0). In an embodiment of the invention, the antenna 130 and the matching unit 140 are configured in a different way according to the aforementioned states.

Figure 3:
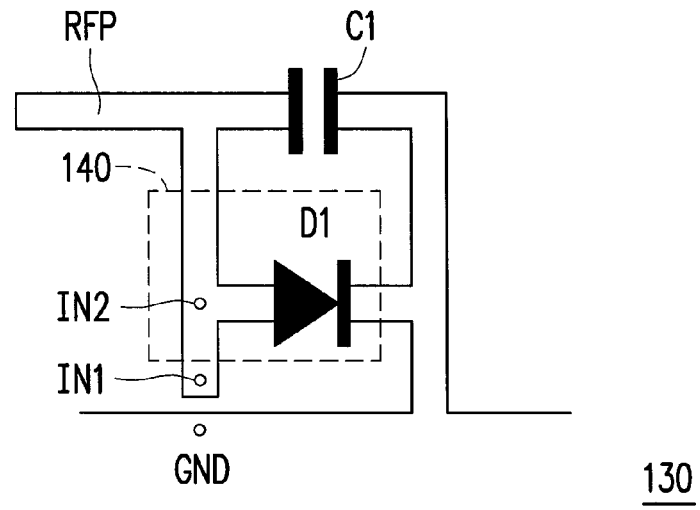
FIG. 3 is a schematic diagram illustrating structures of an antenna and a matching unit of an electronic device according to an embodiment of the invention.

FIG. 3 is a schematic diagram illustrating structures of an antenna and a matching unit of an electronic device according to an embodiment of the invention. Similar to the embodiment of FIG. 2, in this embodiment, the distance between the first main body and the second main body includes the open state and the close state. Referring to FIG. 2 and FIG. 3, the antenna 130 includes a radiation part RFP, a short-circuit end GND, and a first feed-in end IN1, wherein a capacitor C1 is disposed on a path from the radiation part RFP to the short-circuit end GND. The matching unit 140 includes a second feed-in end IN2 and a diode D1. Herein, the second feed-in end IN2 is located between the radiation part RFP and the first feed-in end IN1 of the antenna, and the diode D1 is disposed between the second feed-in end IN2 and the short-circuit end GND. The antenna feeds in an AC bias (radio frequency signal) from the first feed-in end IN1 and resonates to form a mode by the path from the first feed-in end IN1 to short-circuit end GND via the radiation part RFP, so as to send the radio frequency signal. The second feed-in end IN2 feeds in a DC bias to turn on the diode D1. In this embodiment, a high-pass filter or a capacitor is connected to the first feed-in end IN1 by a coaxial cable to provide a signal of the AC bias; and a low-pass filter or an inductor is connected to the second feed-in end IN2 by the coaxial cable to provide a signal of the DC voltage. Simply put, with the filters or capacitor/inductor, the antenna may feed in the DC voltage and the AC bias by the coaxial cable.

The processing unit 160 determines the open or close state of the electronic device 20 when receiving the control signal CS of the electronic device 20 from the sensing unit 150. In this embodiment, when the processing unit 160 determines that the electronic device 20 is in the open state, the processing unit 160 sets the optimizing impedance matching circuit CON to a low-level voltage and sends the low level voltage to the second feed-in end IN2 of the matching unit 140, and two ends of the diode D1 are in an off state. Herein, the low-level voltage may also be a ground voltage.

When the processing unit 160 determines that the electronic device 20 is in the close state, the processing unit 160 sets the optimizing impedance matching circuit CON to a high-level voltage and sends the high voltage to the second feed-in end IN2 of the matching unit 140, the DC bias turns on the diode D1, and two ends of the diode D1 are connected. At the same time, a path from the radiation part RFP via the diode D1 to the short-circuit end GND is generated in the path between the radiation part RFP and the short-circuit end GND. The matching unit 140 adjusts the impedance matching value of the antenna by turning on the aforementioned path, such that the antenna has the best radiation efficiency. It is noted that the path from the radiation part RFP to the short-circuit end GND is a quarter of a wavelength of the radio frequency signal. Simply put, the processing unit 160 determines whether to turn on the diode D1 according to the open or close state of the electronic device 20.

Figure 4:
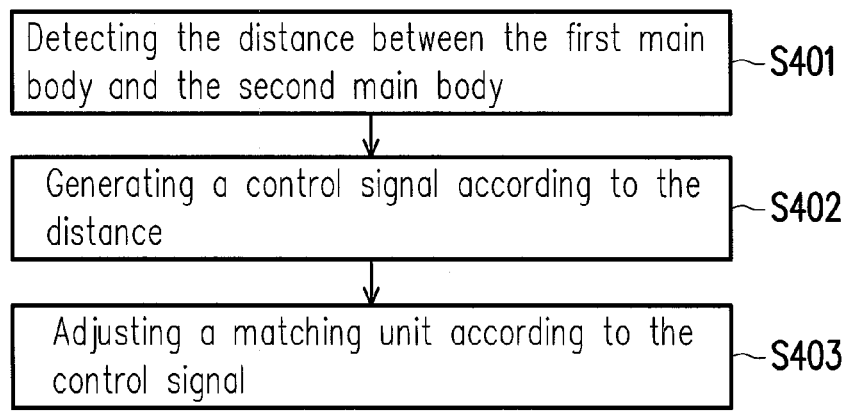
FIG. 4 is a flowchart illustrating an antenna reception tuning method according to an embodiment of the invention.

The invention further provides an antenna reception tuning method. FIG. 4 is a flowchart illustrating the antenna reception tuning method according to an embodiment of the invention. The antenna reception tuning method is adapted for an electronic device, which includes a first main body and a second main body. The first main body is adapted for being opened or closed relative to the second main body. Referring to FIG. 4, first in Step S401, a distance between the first main body and the second main body is detected, wherein the distance includes an angle and an open/close state of the first and the second main bodies. Then in Step S402, a control signal is generated according to the distance. Thereafter, in Step S403, a setting of a matching unit is adjusted according to the control signal, such that the antenna has the best radiation effect.

Figure 5:
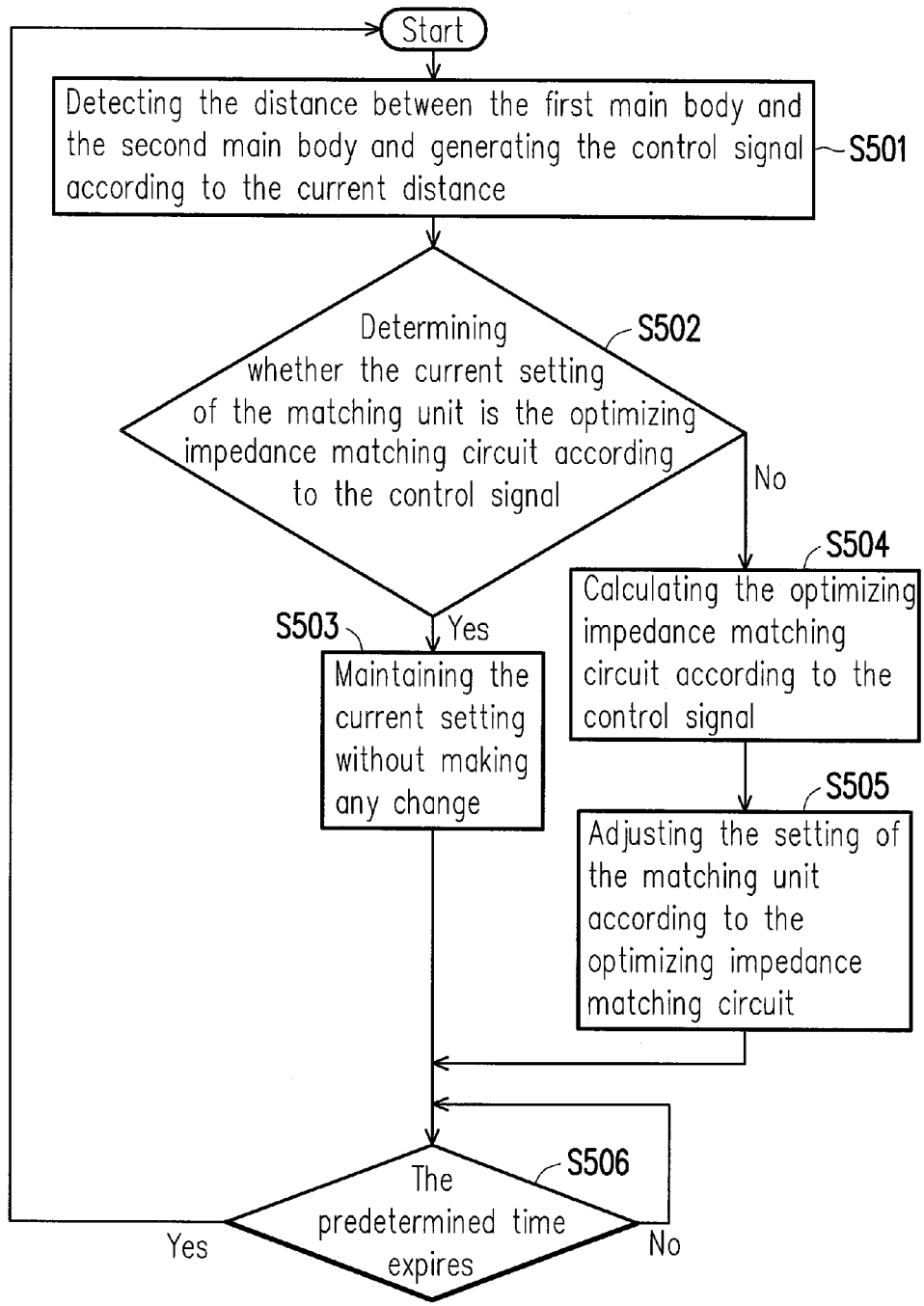
FIG. 5 is a flowchart illustrating an antenna reception tuning method according to an embodiment of the invention.

FIG. 5 is a flowchart illustrating an antenna reception tuning method according to an embodiment of the invention, and FIG. 5 provides more details for carrying out the embodiment compared to FIG. 4. Referring to FIG. 2 and FIG. 5, first in Step S501, the sensing unit 150 detects the distance between the first main body and the second main body, wherein the distance includes the angle and the open/close state. The sensing unit 150 generates the control signal CS according to the current distance and transmits the same to the processing unit 160. Next, in Step S502, the processing unit 160 determines whether the current setting of the matching unit 140 is the optimizing impedance matching circuit according to the control signal CS.

If the current setting of the matching unit 140 is the optimizing impedance matching circuit, the processing unit 160 maintains the current setting and does not make any change to the current setting of the matching unit 140 (Step S503). If the current setting of the matching unit 140 is not the optimizing impedance matching circuit, the processing unit 160 calculates the optimizing impedance matching circuit CON according to the control signal CS (Step S504) and transmits the optimizing impedance matching circuit CON to the matching unit 140, so as to adjust the setting of the matching unit 140 by the optimizing impedance matching circuit CON (Step S505).

It is noted that, when an environment changes and results in that the optimizing impedance matching circuit CON obtained according to the control signal CS is no longer the optimizing impedance matching circuit, the processing unit 160 automatically performs scanning to slightly adjust the impedance matching unit 140 according to the impedance matching value corresponding to the angle, so as to obtain the optimizing impedance matching circuit CON that corresponds to the angle, thereby adjusting the optimizing impedance matching circuit CON in accordance with the change of the environment.

Finally, in Step S506, the processing unit 160 determines whether a predetermined time expires. If the predetermined time expires, the processing unit 160 transmits a command INS to the sensing unit 150 to enable the sensing unit 150 to detect the current distance between the first main body and the second main body, wherein the current distance includes the angle and the open/close state, and to generate the control signal CS according to the current distance and transmit the control signal CS back to the processing unit 160 (Step S501). When the sensing unit 150 detects and transmits the angle and the open/close state back to the processing unit 160, the aforementioned Step S502 to Step S506 are repeated.

In another embodiment of the invention, when the predetermined time expires, the sensing unit 150 directly transmits the control signal CS to the processing unit 160 without receipt of the command INS from the processing unit 160. A length of the predetermined time may be determined based on actual demands, and the invention does not restrict the length of the predetermined time.

To conclude the above, the invention provides the electronic device and the antenna reception tuning method thereof for timely adjusting the impedance matching value of the matching unit according to the angle and open/close state of the main bodies of the electronic device, such that the antenna has better performance in transmission/reception of wireless signals.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An electronic device, comprising:
   a first main body;
   a second main body, comprising at least one antenna and a matching unit and disposed on the first main body through a hinge, the second main body being adapted for being opened or closed relative to the first main body;
   a sensing unit disposed on the electronic device, detecting a distance between the first main body and the second main body, and generating a control signal according to the distance; and
   a processing unit electrically connected to the sensing unit and the matching unit and adjusting the matching unit according to the received control signal,
   wherein, the distance comprises an angle between the first main body and the second main body;
   the processing unit determines whether a setting of the matching unit is an optimizing impedance matching circuit according to the angle; and
   wherein if the matching unit is not the optimizing impedance matching circuit, the processing unit retrieves the optimizing impedance matching circuit of the matching unit that corresponds to the angle, generates the control signal according to the angle, and transmits the control signal to the matching unit to adjust the setting of the matching unit, such that the antenna has the best performance.

2. The electronic device according to claim 1, wherein:
   if the setting of the matching unit is the optimizing impedance matching circuit, the processing unit maintains the setting of the matching unit.

3. The electronic device according to claim 1, further comprising:
   a database coupled to the processing unit, wherein the processing unit retrieves at least one data corresponding to the angle from the database and obtains the optimizing impedance matching circuit according to the angle and the at least one data.

4. The electronic device according to claim 3, wherein:
   if the data of the optimizing impedance matching circuit stored in the database corresponds to one data of a predetermined sector, the optimizing impedance matching circuit of the current angle is calculated and obtained by interpolation or extrapolation.

5. The electronic device according to claim 1, wherein:
if the matching unit is not the optimizing impedance matching circuit, the processing unit automatically performs scanning to slightly adjust the impedance matching unit according to the impedance matching value corresponding to the angle, so as to obtain the optimizing impedance matching circuit that corresponds to the angle.

6. The electronic device according to claim 1, wherein:
the sensing unit periodically detects the angle between the first main body and the second main body at a predetermined time.

7. The electronic device according to claim 1, wherein the distance comprises an open/close state of the first main body and the second main body.

8. The electronic device according to claim 7, wherein:
the antenna comprises a radiation part, a short-circuit end, and a first feed-in end; and
the matching unit comprises a second feed-in end and a diode, wherein the second feed-in end is located between the radiation part and the first feed-in end of the antenna, and the diode is coupled between the second feed-in end and short-circuit end of the antenna.

9. The electronic device according to claim 8, wherein the first feed-in end is connected to an AC bias, and the second feed-in end is connected to a DC bias.

10. The electronic device according to claim 9, wherein if the sensing unit detects that the first main body and the second main body are in a close state, the DC bias turns on the diode.

11. The electronic device according to claim 9, wherein the feed-in of the first feed-in end and the second feed-in end are done via the same coaxial cable.

12. An antenna reception tuning method, adapted for an electronic device comprising a first main body and a second main body, the first main body adapted for being opened or closed relative to the second main body, the antenna reception tuning method comprising:
detecting a distance between the first main body and the second main body;
generating a control signal according to the distance; and
adjusting a matching unit according to the control signal,
wherein detecting the distance comprises detecting an angle between the first main body and the second main body;
wherein the step of adjusting the matching unit according to the control signal further comprises:
determining whether a setting of the matching unit is an optimizing impedance matching circuit according to the angle;
obtaining the optimizing impedance matching circuit of the matching unit that corresponds to the angle according to the angle if the setting of the matching unit is not the optimizing impedance matching circuit; and
adjusting the matching unit by the optimizing impedance matching circuit, such that the antenna has the optimizing signal reception.

13. The antenna reception tuning method according to claim 12, wherein:
if the setting of the matching unit is the optimizing matching circuit, the setting of the matching unit is maintained.

14. The antenna reception tuning method according to claim 12, wherein the step of obtaining the optimizing impedance matching circuit of the matching unit that corresponds to the angle according to the angle comprises:
retrieving at least one corresponding data from a database and calculating the optimizing impedance matching circuit corresponding to the angle according to the at least one data.

15. The antenna reception tuning method according to claim 14, wherein:
if data of the optimizing impedance matching circuit stored in the database corresponds to data of a predetermined sector, the optimizing impedance matching circuit of the current angle is calculated and obtained by interpolation or extrapolation.

16. The antenna reception tuning method according to claim 12, wherein:
if the matching unit is not the optimizing impedance matching circuit, the processing unit automatically performs scanning to slightly adjust the impedance matching unit according to the impedance matching value corresponding to the angle, so as to obtain the optimizing impedance matching circuit that corresponds to the angle.

17. The antenna reception tuning method according to claim 12, wherein the step of detecting the distance between the first main body and the second main body comprises:
periodically detecting the angle between the first main body and the second main body at a predetermined time.

18. The antenna reception tuning method according to claim 12, wherein detecting the distance comprises detecting an open/close state of the first main body and the second main body.

19. The antenna reception tuning method according to claim 18, wherein the electronic device comprises at least one antenna, which comprises a radiation part, a short-circuit end, and a first feed-in end; and
the matching unit comprises a second feed-in end and a diode, wherein the second feed-in end is located between the radiation part and the first feed-in end of the antenna, and the diode is coupled between the second feed-in end and a ground end of the antenna.

20. The antenna reception tuning method according to claim 19, wherein the step of adjusting the matching unit according to the control signal comprises:
connecting the second feed-in end by a DC bias to turn on the diode if the sensing unit detects that the first main body and the second main body are in the close state.

* * * * *